Figure 1:
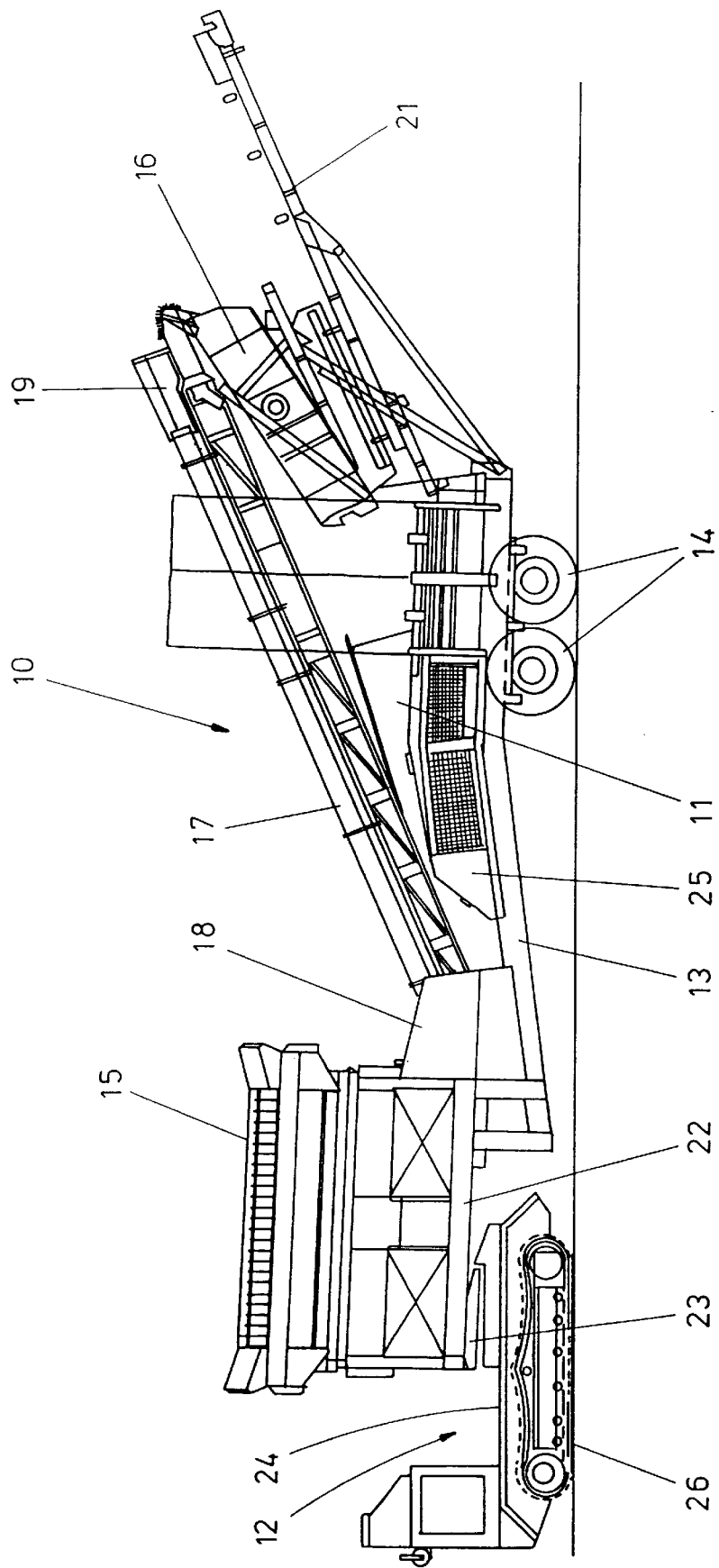

United States Patent [19]
Douglas

[11] Patent Number: 6,098,812
[45] Date of Patent: Aug. 8, 2000

[54] MOBILE SCREENING APPARATUS AND METHOD

[76] Inventor: Patrick Joseph Douglas, Southerlee, College Green, Castletown, Isle of Man 1M9 1BE, United Kingdom

[21] Appl. No.: 08/930,940
[22] PCT Filed: Feb. 12, 1996
[86] PCT No.: PCT/GB96/00240
§ 371 Date: Oct. 10, 1997
§ 102(e) Date: Oct. 10, 1997
[87] PCT Pub. No.: WO96/25245
PCT Pub. Date: Aug. 22, 1996

[30] Foreign Application Priority Data

Feb. 16, 1995 [GB] United Kingdom ............ 9503000

[51] Int. Cl.⁷ .................................................. B07B 1/49
[52] U.S. Cl. .................................... 209/420; 209/421
[58] Field of Search ........................ 209/420, 421, 209/241, 244, 247, 257, 261

[56] References Cited

U.S. PATENT DOCUMENTS 4,861,461  8/1989  Utterback .
4,983,280  1/1991  Eriksson .......................... 209/420 X
5,161,744  11/1992  Schoop et al. .
5,183,160  2/1993  McCain .
5,234,564  8/1993  Smith .

FOREIGN PATENT DOCUMENTS 0 301 798 A1  2/1989  European Pat. Off. .
92 00 237  4/1992  Germany .
WO85/0365  8/1985  WIPO .

*Primary Examiner*—David H. Bollinger
*Attorney, Agent, or Firm*—Workman, Nydegger & Seeley

[57] ABSTRACT

A mobile screening apparatus includes a wheel-supported main frame and a hopper mounted at or near to one end of the main frame. An elevator mounted on the frame feeds material received from the hopper to a screening device which screens the material into different size ranges. Discharge conveyors discharge different size ranges of the screened material to respective discharge positions. A tractor unit is releasably coupled with a towing coupling provided at one end of the main frame. The tractor unit is operative to move the apparatus over the ground while screening operations take place so that traveling deposits of screened material can be formed. A power plant mounted on the frame is arranged to drive the screening device, the elevator, and the discharge conveyors.

13 Claims, 2 Drawing Sheets

MOBILE SCREENING APPARATUS AND METHOD

This invention relates to a mobile screening apparatus, and to a method of screening material and depositing the screened material while the apparatus is moving over the ground.

Screening apparatus are used to screen crushed rock, and other supply of particulate raw material into different size ranges of screened particles, and to distribute the screened fractions to separate discharge positions.

In a typical installation of a screening apparatus or plant in a quarry, the apparatus has a number of separate discharge conveyors or elevators, each being associated with a separate screening fraction from the usual multi-deck screen, and which can deposit separate stockpiles of different sizes e.g. sand, small aggregate or gravel, and ballast suitable for building or road foundation work.

At some sites, a screening plant is set-up as a permanent, or semi-permanent installation, and which is assembled on site, and which has to be dis-assembled and transported as separate components before re-assembly at a new site. However, at other locations, it is known and desirable to use mobile screening apparatus which can be towed from one site to another, and including along the public highway. Mobile apparatus can be converted relatively easily between a transport mode and an operative screening mode.

The present invention is concerned with what is believed to be a unique concept in screening apparatus, in that it enables, when desired, screening operations to be carried out while the apparatus is moving over the ground.

According to one aspect of the invention there is provided a mobile screening apparatus which comprises:

a wheel-supported main frame;

a hopper mounted at or near to one end of the main frame to receive a supply of bulk material which is to be screened;

an elevator mounted on the frame and having a lower receiving end arranged to receive material from the hopper, and to convey this material to an upper discharge end of the elevator;

a screening device mounted on the frame and arranged to receive material from the discharge end of the elevator, and to screen the material into different size ranges;

discharge means associated with the screening device and operative to discharge the different size ranges to respective discharge positions;

a towing coupling provided at said one end of the frame; and a tractor unit releasably coupled with said towing coupling and operative to move the apparatus over the ground while screening operations take place, whereby travelling deposits of screened material can be formed.

The tractor unit may be used to tow the apparatus at a continuous relatively slow speed, or to move the apparatus in small increments, according to the requirements for the travelling deposit of screened material.

According to a further aspect of the invention there is provided a mobile screening apparatus which comprises:

a wheel-supported main frame;

a hopper mounted at or near to one end of the main frame to receive a supply of bulk material which is to be screened;

conveyor means mounted on the main frame and having one end arranged to receive material from the hopper, and an opposite end forming a discharge end;

a screening device mounted on the frame and arranged to receive material from the discharge end of the conveyor means, and to screen the material into different size ranges;

discharge means associated with the screening device and operative to discharge the different size ranges to respective discharge positions;

a towing coupling provided at said one end of the frame;

a power plant arranged to drive the screening device, the conveying means, and the discharge means; and a tractor unit releasably coupled with said towing coupling, said tractor unit being arranged to derive its motive power from said power plant in order to move the apparatus over the ground when required.

Preferably, the power plant is mounted on the main frame of the screening apparatus, and any suitable means may be used to transmit motive power to the tractor unit. By way of example only, the tractor unit may have a hydraulic drive motor, and the power to operate the motor may therefore comprise hydraulic pressure flow and return lines running between the power plant and the hydraulic motor, and with releasable couplings provided in the pressure lines to permit the tractor unit to be uncoupled from the screening apparatus e.g. when the apparatus is required to carry out screening operations at a particular fixed location.

In both aspects of the invention, the tractor unit is preferably provided with endless or crawler tracks, and will normally move at relatively slow speed. The tractor unit may have a driver's cab, if it is desired to provide driver control of the movement and operation of the screening apparatus.

However, it is within the scope of the invention for the tractor unit/screening apparatus combination to be operated by remote control, if required, e.g. by use of radio or infrared remote control.

Preferably, the screening apparatus has a number of separate discharge conveyors, corresponding in number to the number of different size ranges of screened material derivable from the screening device, and at least some of the conveyors may be arranged to be convertible between inoperative stowed positions e.g. suitable for transport when it is required to move the apparatus from one site to another, (and of minimum projection from the general body of the apparatus), and extended operative positions for discharge of screened material some distance away from the general body of the apparatus.

The apparatus may have one or more "side conveyor", which can project laterally of the apparatus, and which can form a travelling heap of deposited screened material alongside the apparatus while the latter is on the move. Alternatively, the side conveyor may cause progressive filling of trenches alongside the travelling apparatus e.g. for back-filling of pipelines laid in the trenches.

The apparatus may also have a so-called "tail conveyor", which projects rearwardly of the apparatus in a discharge position, and which can allow a trailing heap of deposited material to be formed which follows the travelling apparatus. Alternatively, the tail conveyor may be omitted, and the screening device may be arranged to discharge at least part of the screened fraction of material directly to the ground as a trailing deposit of material.

The travelling screening apparatus therefore can form continuous or intermittent travelling deposits of screened material e.g. travelling heaps of deposited material alongside and/or trailing behind the apparatus, somewhat in the manner of harvested crops deposited in a field by a harvesting machine in the form of "windrows".

The screening device may take any suitable form, and may comprise a multi-deck screen, a single screen, bar grizzly type screen, or any other screening elements known per sé for use in screening crushed rock and other minerals, or even bulk raw material supplied during site excavation, which can include soil, building rubble, tree roots etc.

The towing coupling can take any suitable form to allow easy coupling, and uncoupling between the screening apparatus and the tractor unit. In a preferred arrangement, the towing coupling is provided on the underside of a base or platform on which the hopper is mounted, and the towing coupling may comprise a "fifth wheel coupling" known per sé. However, other types of towing coupling may be used including a slew ring type of coupling.

The invention also includes a method of screening material and depositing the screened material, utilising a mobile screening apparatus according to said one or to said further aspect of the invention, and optionally with preferred features thereof referred to above.

Figure 2:
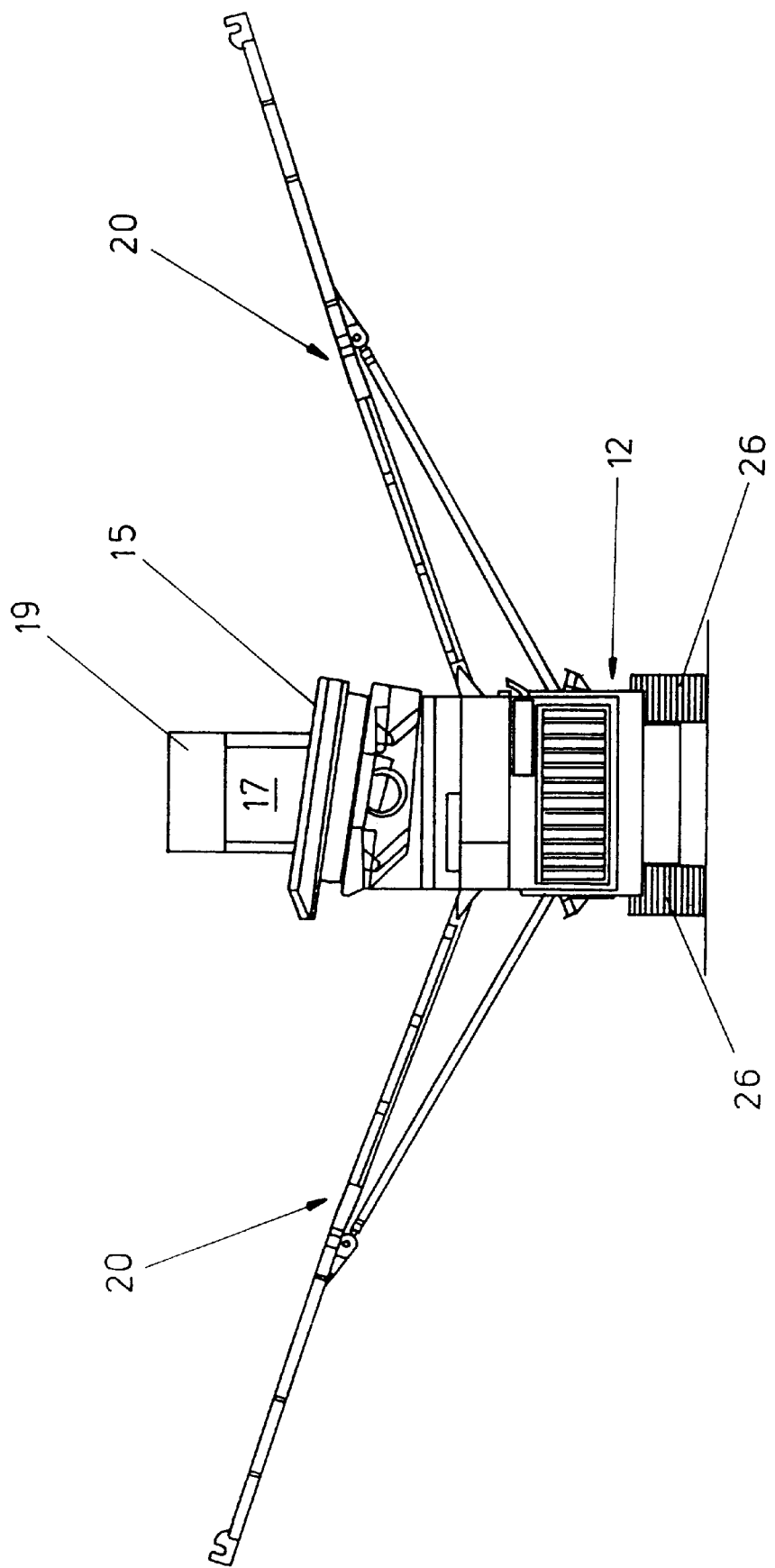

A preferred embodiment of mobile screening apparatus according to the invention will now be described in detail, by way of example only, with reference to the accompanying drawings, in which:

FIG. 1 is a side view of a mobile screening apparatus according to the invention and forming part of a towed combination with a tractor unit; and FIG. 2 is a front view of the combination, and with side conveyors unfolded to operative discharge positions for discharging respective screened fractions of material from a screening device of the apparatus.

Referring now to the drawings, a mobile screening apparatus according to the invention is designated generally by reference 10, and comprises screening plant 11 and tractor unit 12 forming a towed combination. However, plant 11 can operate as a "stand alone" installation in order to carry out screening functions as required.

The screening plant 11 comprises a wheel-supported main frame or chassis 13 having a tandem axle wheelset 14 supporting the rear end of the chassis, and provided with a hopper 15 mounted at or near to the front end of the chassis 13. Hopper 15 can be of conventional construction, and is arranged to receive a supply of bulk material which is to be screened.

A conveying means is mounted on chassis 13 to convey material from the hopper 15 to a screening device 16, and comprises an elevator 17 having a lower receiving end 18 arranged to receive material from the hopper 15, and an upper discharge end 19 from which the elevated material is discharged to the screening device 16. The screening device 16 preferably comprises a screen box comprising a multi-deck arrangement of screens, and which is pivotally mounted on the chassis 13 for adjustment purposes, to co-operate automatically with length wise adjustment of the elevator 17, in a preferred arrangement, which is disclosed in more detail in European Patent No 0301798.

The screening device 16 screens the material into different size ranges in any suitable well-known manner and discharge means is associated with the screening device 16 and is operative to discharge the different size ranges to respective discharge positions. The discharge means, in the illustrated embodiment, comprises a pair of foldable side conveyors 20, which are shown in FIG. 2 in laterally extended discharge positions. The plant 11 may also be provided with a "tail conveyor" 21, which is shown in FIG. 1 in the rearwardly extended operative position for depositing screened material in a heap to the rear of the apparatus.

A towing coupling is provided at the forward end of the main frame 13, and tractor unit 12 is releasably coupled with the towing coupling and is operative to move the screening apparatus over the ground while screening operations take place whereby travelling deposits of screened material can be formed. The towing coupling is preferably provided on the underside of a base or platform 22 of hopper 15 and may comprise a coupling element suitable for making sliding contact with a fifth wheel coupling 23 which is mounted on a load bearing platform 24 on tractor unit 12 in any well-known manner. However, other types of towing coupling may be provided including a slew ring arrangement.

A power plant is mounted on chassis 13 and is arranged to drive the screening device 16, elevator 17 and the discharge conveyors 20 and 21. The power unit is shown by reference 25 in FIG. 1, and comprises a motor and drive trains (not shown in detail) to operate the various components of the screening apparatus in any suitable known manner.

The tractor unit 12 may comprise a driver's cab, if it is desired to provide driver control of the movement and operation of the screening apparatus. However, if it is required to provide remote control over the movement and operation of the tractor unit/screening apparatus combination, this may be achieved by use of radio or infra-red remote control. The tractor unit 12 is preferably arranged to derive its motive power from the power plant 25, and this may be achieved by use of any suitable power transmission means e.g. using hydraulic pressure flow and return lines running between power plant 25 and a hydraulic drive motor or motors in the tractor unit 12.

The tractor unit 12 is primarily intended to be a relatively slow speed motive unit, and therefore is provided with endless or crawler tracks 26.

As mentioned above, screening plant 11 can be operated in a "stand alone" mode, but when it is coupled to tractor unit 12, it can be readily towed to a desired new location, and if it is being moved a considerable distance, the screening plant 11 can be converted to transport mode by suitable folding of the discharge conveyors to stowed positions. However, if it is desired to carry out screening operations while the plant is travelling, so as to form travelling deposits of screened material, the screening apparatus can be operating continuously while it is being towed, and with the discharge conveyors in the discharge position. Heaps of screened material can be formed as separate deposits alongside the travelling apparatus and/or as trailed deposits behind it, or the material can be discharged to form foundation material, or to fill trenches as back-fill, following laying of pipelines into the trenches.

What is claimed is:

1. A mobile screening apparatus which comprises:
   a wheel-supported main frame;
   a hopper mounted at or near to one end of the main frame to receive a supply of bulk material which is to be screened;
   an elevator mounted on the frame and having a lower receiving end arranged to receive material from the hopper, and to convey this material to an upper discharge end of the elevator;
   a screening device mounted on the frame and arranged to receive material from the discharge end of the elevator, and to screen the material into different size ranges;
   discharge means associated with the screening device and operative to discharge the different size ranges to respective discharge positions;
   a towing coupling provided at said one end of the frame; and
   a tractor unit releasably coupled with said towing coupling and operative to move the apparatus over the ground, said tractor unit being short in length relative to the length of the screening apparatus and being supported by endless tracks so as to render the tractor unit/screening apparatus combination highly maneuverable, the tractor unit including a driver's cab to permit driver control of the movement and/or operation of the screening apparatus.

2. Apparatus according to claim 1, in which the tractor unit/screening apparatus combination is arranged to be capable of operation by remote control.

3. Apparatus according to claim 1, in which the discharge means comprises at least one side conveyor.

4. Apparatus according to claim 3, including means for discharging one fraction of screen material rearwardly of the apparatus.

5. Apparatus according to claim 1, including a tail conveyor mounted at the rear end of the apparatus.

6. Apparatus according to claim 1, in which the hopper includes a screening device which is operable to carry out at least a preliminary screening operation on the bulk material.

7. A mobile screening apparatus which comprises:

a wheel-supported main frame;

a hopper mounted at or near to one end of the main frame to receive a supply of bulk material which is to be screened;

conveyor means mounted on the main frame and having one end arranged to receive material from the hopper, and an opposite end forming a discharge end;

a screening device mounted on the frame and arranged to receive material from the discharge end of the conveyor means, and to screen the material into different size ranges;

discharge means associated with the screening device and operative to discharge the different size ranges to respective discharge positions;

a towing coupling provided at said one end of the frame;

a power plant arranged to drive the screening device, the conveying means, and the discharge means; and a tractor unit releasibly coupled with said towing coupling, said tractor unit being arranged to derive its motive power from said power plant in order to move the apparatus over the ground when required.

8. Apparatus according to claim 7, in which the power plant is mounted on the main frame of the screening apparatus.

9. Apparatus according to claim 8, in which the tractor unit includes one or more hydraulic drive motors operable by hydraulic pressure flow and return lines running between the power plant and the one or more hydraulic drive motors.

10. A method of screening a supply of bulk material and discharging the screened bulk material at spaced-apart discharge positions, the method comprising the steps of:

receiving a supply of bulk material within a hopper, the hopper being mounted at or near to one end of a wheel-supported main frame, the one end of the main frame also being releasably coupled with a tractor unit, the tractor unit being short in length relative to the length of the main frame and being supported by endless tracks;

elevating the bulk material from the hopper to an elevated screening device mounted on the main frame;

screening the bulk material into different size ranges through the screening device;

discharging the screened bulk material to respective discharge positions; and moving the wheel-supported mainframe via the tractor unit when it is required to form further stockpiles, and carrying out further screening operations.

11. A mobile screening apparatus which comprises:

a wheel-supported main frame;

a hopper mounted at or near to one end of the main frame to receive a supply of bulk material which is to be screened;

an elevator mounted on the frame and having a lower receiving end arranged to receive material from the hopper, and to convey this material to an upper discharge end of the elevator;

a screening device mounted on the frame and arranged to receive material from the discharge end of the elevator, and to screen the material into different size ranges;

discharge means associated with the screening device and operative to discharge the different size ranges to respective discharge positions;

a towing coupling provided at said one end of the frame; and a tractor unit releasably coupled with said towing coupling and operative to move the apparatus over the ground, said tractor unit being short in length relative to the length of the screening apparatus and being supported by endless tracks so as to render the tractor unit/screening apparatus combination highly maneuverable, the tractor unit/screening apparatus combination being arranged so as to be capable of operation by remote control.

12. A mobile screening apparatus which comprises:

a wheel-supported main frame having a forward end;

a hopper positioned at the forward end of the main frame, the hopper being configured to receive a supply of bulk material to be screened;

a support platform configured to support the hopper, the support platform being secured to the forward end of the main frame;

an elevator mounted on the main frame and having a lower receiving end and an upper discharge end, the lower receiving end being configured to receive material from the hopper;

a screening device mounted on the main frame and configured to receive material from the discharge end of the elevator and screen the material into different size ranges;

means associated with the screening device for discharging the different size ranges of the material to respective discharge positions;

a releasable coupling positioned on the underside of the support platform; and a tractor unit releasably coupled with the coupling on the support platform and operative to move the apparatus over the ground during screening of the material, the tractor unit being supported by endless tracks which are short in length relative to the length of the screening apparatus so as to render the tractor unit/screening apparatus combination maneuverable.

13. A mobile screening apparatus as recited in claim 12, further comprising a brace downwardly projecting from the underside of the support platform, the brace being configured to support the releasable coupling off the ground surface when the tractor unit is separated from the support platform.

* * * * *